(12) United States Patent
Ullrich et al.

(10) Patent No.: US 9,964,948 B2
(45) Date of Patent: May 8, 2018

(54) REMOTE CONTROL AND CONCIERGE SERVICE FOR AN AUTONOMOUS TRANSIT VEHICLE FLEET

(71) Applicants: Oliver Ullrich, Miami, FL (US);
Naphtali Rishe, Miami Beach, FL (US)

(72) Inventors: Oliver Ullrich, Miami, FL (US);
Naphtali Rishe, Miami Beach, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days. days.

(21) Appl. No.: 15/429,261

(22) Filed: Feb. 10, 2017

(65) Prior Publication Data

US 2017/0308082 A1   Oct. 26, 2017

Related U.S. Application Data

(60) Provisional application No. 62/325,331, filed on Apr. 20, 2016.

(51) Int. Cl.
*G05D 1/00* (2006.01)
*G05D 1/02* (2006.01)

(52) U.S. Cl.
CPC ......... *G05D 1/0038* (2013.01); *G05D 1/0061* (2013.01); *G05D 1/0088* (2013.01); *G05D 1/0297* (2013.01); *G05D 1/0027* (2013.01); *G05D 1/0244* (2013.01); *G05D 2201/0212* (2013.01)

(58) Field of Classification Search
CPC .. G05D 1/0038; G05D 1/0297; G05D 1/0244; G05D 1/0061; G05D 1/0088; G05D 2201/0212; G05D 1/0027
See application file for complete search history.

(56) References Cited

U.S. PATENT DOCUMENTS

| | | | | |
|---|---|---|---|---|
| 5,657,226 A * | 8/1997 | Shin | ................ | B60K 31/0008 180/167 |
| 5,684,696 A * | 11/1997 | Rao | .................. | B60K 31/0008 318/587 |
| 5,838,562 A * | 11/1998 | Gudat | ............... | B60K 31/0008 180/167 |
| 6,515,377 B1 * | 2/2003 | Ubelein | ................ | B60J 7/0573 307/10.1 |
| 8,237,389 B2 * | 8/2012 | Fitch | ....................... | B25J 13/06 180/271 |
| 9,494,439 B1 | 11/2016 | Ross et al. | | |
| 2007/0198142 A1 * | 8/2007 | Werback | ............. | G08G 5/0008 701/3 |

(Continued)

*Primary Examiner* — Jason Holloway
(74) *Attorney, Agent, or Firm* — Saliwanchik, Lloyd & Eisenschenk

(57) ABSTRACT

Methods and systems for assisting autonomous vehicles are provided. The methods and systems can help increase safety and consumer satisfaction with autonomous vehicles and help bridge the gap towards completely autonomy. A method for assisting autonomous vehicles can include providing an autonomous vehicle having sensory inputs and providing a remote control center having two-way communication with the autonomous vehicle. The autonomous vehicle can send its sensory input information to the control center and the control center can send control information to the autonomous vehicle.

19 Claims, 11 Drawing Sheets

(56) References Cited

U.S. PATENT DOCUMENTS

| | | | | |
|---|---|---|---|---|
| 2008/0086241 A1* | 4/2008 | Phillips | ............... | G05D 1/0038 701/2 |
| 2008/0091309 A1* | 4/2008 | Walker | ................... | B60R 25/02 701/1 |
| 2009/0079839 A1* | 3/2009 | Fischer | .................. | G01S 7/003 348/218.1 |
| 2009/0281676 A1* | 11/2009 | Beavis | .................... | G06F 1/266 700/295 |
| 2010/0106356 A1* | 4/2010 | Trepagnier | ............ | G01S 17/023 701/25 |
| 2012/0143430 A1* | 6/2012 | Broggi | ................. | G01S 17/023 701/28 |
| 2014/0136045 A1* | 5/2014 | Zhu | ...................... | G05D 1/0055 701/23 |
| 2014/0303827 A1* | 10/2014 | Dolgov | ................ | B60W 30/00 701/23 |
| 2015/0039157 A1* | 2/2015 | Wolfe | .................... | G06F 17/00 701/2 |
| 2015/0097669 A1* | 4/2015 | Li | ......................... | G08B 5/222 340/539.13 |
| 2015/0248131 A1* | 9/2015 | Fairfield | ............. | G05D 1/0044 701/2 |
| 2015/0254986 A1* | 9/2015 | Fairfield | .................. | G08G 1/22 707/687 |
| 2015/0338852 A1* | 11/2015 | Ramanujam | ........... | G01C 21/26 701/2 |
| 2016/0316363 A1* | 10/2016 | Li | ......................... | H04W 12/04 |
| 2016/0334229 A1* | 11/2016 | Ross | .................... | G05D 1/0022 |

* cited by examiner

REMOTE CONTROL AND CONCIERGE SERVICE FOR AN AUTONOMOUS TRANSIT VEHICLE FLEET

CROSS-REFERENCE TO RELATED APPLICATION

This application claims the benefit of U.S. Provisional Application Ser. No. 62/325,331, filed Apr. 20, 2016, the disclosure of which is hereby incorporated by reference in its entirety, including all figures, tables and drawings.

GOVERNMENT SUPPORT

The subject invention was made with government support under a research project supported by the NSF, Award No. U.S. Pat. No. 1,213,026. The government has certain rights in the invention.

BACKGROUND OF THE INVENTION

Autonomous navigation and driving technology are new, and a number of shortfalls exist regarding the deployment of autonomous vehicles, especially in public transit. These shortfalls can result from malfunction of sensora or software's inability to resolve unforeseen situations (e.g., deadlock situations involving pedestrians in a mixed-use street), security concerns resulting from the absence of a driver, and the missing option for a passenger to ask a driver or attendant for information or assistance.

BRIEF SUMMARY OF THE INVENTION

Cost-efficient systems and methods to add services to and to remotely control one or more autonomous transit vehicles are provided. Advanced analytics software, simulator toolsets, and interfaces can be used. A small number of operators can control a larger number of vehicles, providing a concierge service to passengers and remotely controlling the autonomous vehicles. Operators in a control center can communicate with passengers and obtain control of autonomous vehicles in a variety of situations, such as when a passenger may require assistance, emergency situations (e.g., in a deadlock with pedestrians on a mixed use street), when events are detected via fuzzy logic, or when there is a passenger request by button or voice. Operators can switch between immersive environments of different autonomous vehicles. In any given environment, an operator can see a panorama outside and inside the vehicle, and can hear all, talk to people within and outside the vehicle, and remotely drive the vehicle using a simulator or other means.

A method for assisting autonomous vehicles according to an embodiment of the present invention can include providing an autonomous vehicle having sensory inputs, and providing a control center having two-way communication with the autonomous vehicle, including the autonomous vehicle sending sensory input information to the control center and the control center sending control information to the autonomous vehicle. When an event occurs, the autonomous vehicle can communicate the event with the control center and begin a dialogue with the control center or allow the control center to take over the autonomous vehicle.

The sensory inputs of the autonomous vehicle can include an exterior front-facing video camera, an exterior rear-facing video camera, a panoramic video camera, an exterior microphone, an interior microphone, a passenger assistance button, and an emergency stop button. The sensory inputs can also include radar and sonar data that help the autonomous vehicle navigate its environment. The control center can control all facets of the autonomous vehicle, including steering, braking, acceleration, locking of doors, and opening and closing of doors and windows. The control center can also control audio equipment on the autonomous vehicle, including a horn, a general inside speaker, a general outside speaker, a front facing outside speaker, and one or more passenger specific inside speakers.

While the vehicle is operating autonomously, it can alert the control center or open a dialogue with the control center if an event occurs. Events can include a variety of situations including a passenger pushing a passenger assistance button, a passenger pushing a emergency stop button, and deadlock situations. Deadlock situations can occur when the autonomous vehicle software analysis reaches a threshold uncertainty level or a threshold risk level, or when there is a failure of autonomous control. A deadlock situation can also occur when the programming or program execution of the autonomous vehicles navigation system freezes, is unable to determine navigational steps or otherwise quits working. The threshold risk level and the threshold uncertainty level can be part of the programming of the autonomous vehicle. For instance, there may be a situation involving pedestrians in the roadway having unpredictable behavior. An event may also be triggered by a pedestrian or bicyclist getting too close to the autonomous vehicle or approaching at a high rate of speed. Another example is when the automatic guidance sensors of the autonomous vehicles are somehow compromised (e.g. the radar equipment stops working, or debris, fog, rain, snow or other weather conditions are signaling that the sensory equipment cannot be relied upon).

The control center control can service numerous autonomous vehicles at once, such as with a public transit system. Therefore, the autonomous vehicles that can operate within the present invention include multi-passenger vehicles such as busses, vans, railway vehicles, and trolleys. The present invention can be particularly useful in public transportation and multi-passenger vehicles because it can allow for passengers to exchange information with the control center about safety or emergency situations, or less important occasions such as passengers needing directions, help using handicap access, and route deviations or stops.

The control center can include multiple ways of controlling the autonomous vehicle including user interfaces, speakers, and visual displays. Furthermore, the control center can allow for the operator to select which sensor inputs are displayed via the user interface. The control center may accomplish this using an immersive simulator, much like that of a driver's seat.

The data captured using the sensory inputs of the autonomous vehicle can be saved for a period of time for review. Furthermore, a central server can be used as a hub of communication between the control center and the autonomous vehicles. The autonomous vehicles can then continuously transfer data to the central server where it can be saved for a period of time.

Instead of waiting for an event to occur, the control center can observe the sensor inputs and take control of the autonomous vehicles at any time. Furthermore, the central server can apply machine learning and fuzzy logic methods to analyze data from the sensory inputs. This may be particularly useful in handling non-emergency events such as general inquiries from passengers.

DETAILED DESCRIPTION OF THE INVENTION

Figure 1:
FIG. 1 shows an image of a vehicle simulator according to an embodiment of the subject invention.

Cost-efficient systems and methods to add services to and to remotely control one or more autonomous transit vehicles are provided. Advanced analytics software and simulator toolsets (e.g., a standard simulator toolset) and interfaces can be used. A small number of operators can control a larger number of vehicles, providing a concierge service to passengers and emergency remote driving triggered by events, such as the inability to resolve a situation or the need to request help (e.g., in a deadlock with pedestrians on a mixed use street), or when events are detected via fuzzy logic, or a request by passenger by button or voice. Operators can switch between immersive environments of vehicles they control. In any given environment, an operator can see a panorama outside and inside the vehicle, and can hear and talk to people within and outside the vehicle, and remotely drive the vehicle.

In many embodiments, a fleet of autonomous transit vehicles can be deployed (e.g., for community transit or demand-responsive transit services). A simulator tool, such as that depicted in FIG. 1, can be placed at a control center, and extended with software enabling an operator to take remote control of an autonomous vehicle. Each vehicle can be equipped with sensors (e.g., panorama video cameras), both for the vehicle's interior and exterior views. The sensors can also include one or more microphones, and one or more "assistance" type push buttons.

Embodiments of the present invention can include methods and systems for assisting autonomous vehicles. The methods and systems of the present invention can help increase safety and consumer satisfaction with autonomous vehicles and help bridge the gap towards completely autonomation.

A method for assisting autonomous vehicles according to the present invention can include providing an autonomous vehicle having sensory inputs and providing a remote control center having two-way communication with the autonomous vehicle. The autonomous vehicle can send its sensory input information to the control center and the control center can send control information to the autonomous vehicle. The communication can occur over existing wireless networks and the latency period should be as short as possible, such that the system is operating in real time. That is, the connection should be fast enough such that an operator in the control room can receive sensory input data from the autonomous vehicle and then effectively control the autonomous vehicle based on the received data.

The autonomous vehicle can automatically initiate a dialogue or prompt the control center when an event occurs. In this way, the control center can increase safety of autonomous vehicle operations, assist in emergencies, and otherwise increase passenger satisfaction. Events can include a broad variety of scenarios such as a passenger pushing a passenger assistance button (e.g., to ask for directions, to request a stop, to report an emergency, or to ask for general assistance) or a passenger pushing an emergency stop button. Events can also include autonomous vehicle system malfunctions and deadlock situations in which the software of the autonomous vehicle reaches an impasse. Events can also include situations in which the autonomous vehicle reaches a threshold uncertainty level, a threshold risk level, and a failure of autonomous control. For example, the autonomous vehicle may use a variety of techniques for navigating the streets including radar, sonar, and global positioning systems. If for some reason the autonomous vehicles navigation system's are not functioning properly because its equipment has been compromised (e.g., due to weather conditions, equipment failures, or debris), the software of the autonomous vehicle can record an event, send a signal, and initiate a response or a dialogue with the control center. Then, an operator of the control center can take control of the vehicle.

The sensory inputs of the autonomous vehicle can include one or more of an exterior front-facing video camera, a rear-facing video camera, a panoramic video camera, an exterior microphone, an interior microphone, a passenger assistance button, and an emergency stop button. The front facing camera can capture vehicles, pedestrians, bicyclists, roadway hazards, and normal driving activities. The rear-facing camera can act much the same way as a rear-view mirror. The exterior microphone can be used by an operator of the control room to communicate with those outside the vehicle to help when there is a safety issue, an emergency, or another type of event where communication may be beneficial.

The autonomous vehicle can be for public use and can be multi-passenger, such as a bus, a van, a trolley, or another type of multi-passenger vehicle. An autonomous multi-passenger vehicle can include passenger assistance buttons and interior microphones. For example, a passenger assistance button and a microphone can be provided for each row of seats or each individual seat. The passenger may request information by initiating a dialogue with the control center via the passenger assistance button, and the control center can include control center operators that can communicate with passengers via the microphones and speakers.

The control center can control all aspects of the autonomous vehicle including steering, braking, acceleration, locking of doors, and opening and closing of doors and windows of the autonomous vehicle. The control center can also control other aspects of the autonomous vehicle including a horn, a general inside speaker, a general outside speaker, a front facing outside speaker, and one or more passenger specific inside speakers.

The control center can oversee multiple autonomous vehicles as the control center will generally only need to assist the autonomous vehicles during events, which should be infrequent. However, the control center can on its own accord and at any time monitor the sensory inputs from the autonomous vehicle. In other words, an event is not required for the control center to take control or observe the operations of the autonomous vehicle.

The control center can include a variety of interfaces for monitoring the sensory inputs of the autonomous vehicle as well as controlling the autonomous vehicle. The control center can include speakers and video displays, and can switch between sensory inputs based on the commands of a control center operator. The control center can include a vehicle simulator, including a brake, an accelerator, a visual display (including any or all of the sensory inputs of the autonomous vehicle), a steering wheel, one or more speakers, a headset, and a microphone. The simulator can be used by the control room operators to control the movement of the autonomous vehicle, to communicate with passengers, and communicate with those outside of the autonomous vehicle. An example of a control center simulator according to the present invention can be seen in FIG. 1.

A central server can act as a hub between the autonomous vehicle and the control center. The autonomous vehicle can initiate communication with the control center or central server only when an event occurs, or the autonomous vehicle can continuously send sensory input information to the central server. The autonomous vehicle can continuously save the sensory input information for a period of time (e.g. 1 minute, 30 minutes, 1 hour, 4 hours, 12 hours, 1 day, 2 days, or 3 days). If requested, the autonomous vehicle can send the saved information to the central server or the control center. In addition, or in the alternative, the autonomous vehicle can continuously send sensory input information to the central server and the central server can save the sensory input information for a period of time (e.g. 1 minute, 30 minutes, 1 hour, 4 hours, 12 hours, 1 day, 2 days, 3 days, a week, a month). Therefore, an operator in the control room can review the saved sensory input information for safety analysis, failure analysis, or other purposes.

The server and its processors can apply machine learning and fuzzy logic methods to analyze data from the sensory inputs, including the determination of when events occur. Furthermore, machine learning and automation can be employed in the server and the control center to monitor, evaluate, and respond to events. Furthermore, the server can prioritize the sensory inputs or events for the control room. For example, safety concerns can be prioritized before deadlock situations, security concerns, and passenger information requests.

In an embodiment, the data collected by these sensors can be streamed live via a wireless communication network to a central server. The server can apply machine learning and/or fuzzy logic methods to analyze the data and detect unforeseen situations, which can be referred to as events. These events might include a deadlock situation on a mixed-use street, an information request by a passenger, and a security relevant situation. If the software detects an event, it can alert personnel at the control center that their attention is required. It may automatically invoke an immersive environment for an operator to be in control of the specific vehicle where the event has occurred. An operator can then assess the situation using the simulator tool (e.g., a standard simulator tool), which can present live and recorded data streams, including, for example, an immersive panorama of both outside and inside the vehicle, and audio recordings/streams of both inside and outside the vehicle.

Figure 2:
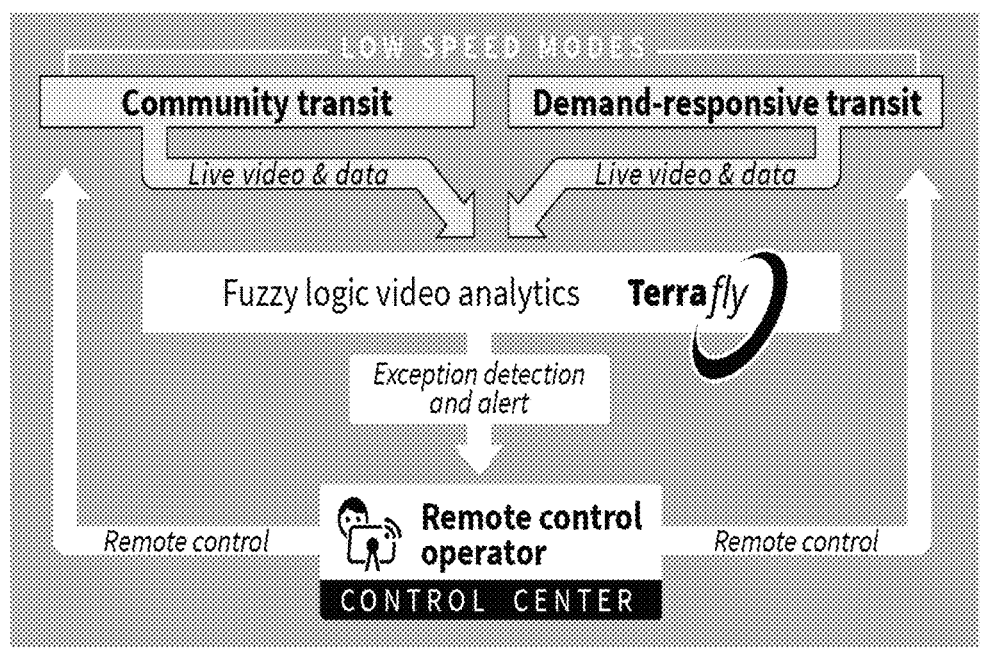
FIG. 2 shows a simplified data flow of a method of an embodiment of the subject invention.

In an embodiment, the operator can then be enabled to: engage with passenger (e.g., via a bi-directional audio channel, or via a video camera in operable communication with the vehicle's passenger information screen); engage with a person in the vicinity of the vehicle (e.g., a pedestrian in the path planned by the vehicle's autonomous driving software, for example, via a bi-directional audio channel, or via a video connection to a front-facing screen at the vehicle's windshield); and/or take remote control of the vehicle by using the extended simulator tool to defuse the event (e.g., to navigate around an obstacle or to back off from a confused bicyclist). An example of a data flow according to the present invention is represented in FIG. 2.

Figure 3:
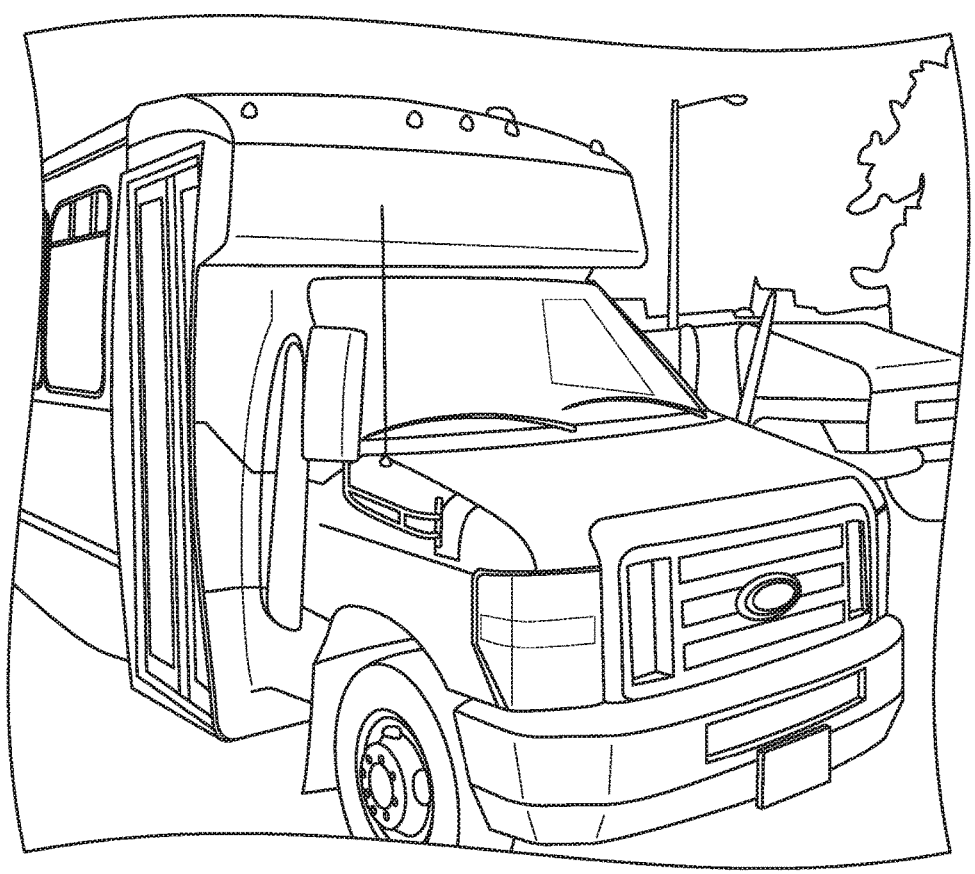
FIG. 3 shows an image of a vehicle (2008 Ford E-450) that can be used with an embodiment of the subject invention.
Figure 4:
FIG. 4 shows an image of a vehicle (MotoEV Electro TransitBuddy 15) that can be used with an embodiment of the subject invention.

Embodiments of the subject invention can be used for many applications, including an improved public transit network. For example, an innovative public transit network can be operated by a transportation or management association, and can include multiple routes serviced by autonomous transit vehicles, which can be fully integrated with a traffic information and management system (e.g., an Informed Traveler Program and Application (ITPA) traffic information and management system). The routes for autonomous transit can be selected to include instances of different types of major transit, including but not limited to express bus transit, community or feeder bus transit, and demand-responsive transit. FIGS. 3, 4, 6, and 7 show images of examples of vehicles that can be used as autonomous vehicles in the present invention. FIG. 3 shows a surplus 20 seat (plus one wheelchair) 2008 Ford E-450 bus, which could be converted to bio-diesel and autonomous driving, and FIG. 4 shows a converted 15-seat electric MotoEV Electro TransitBuddy 15.

Figure 5:
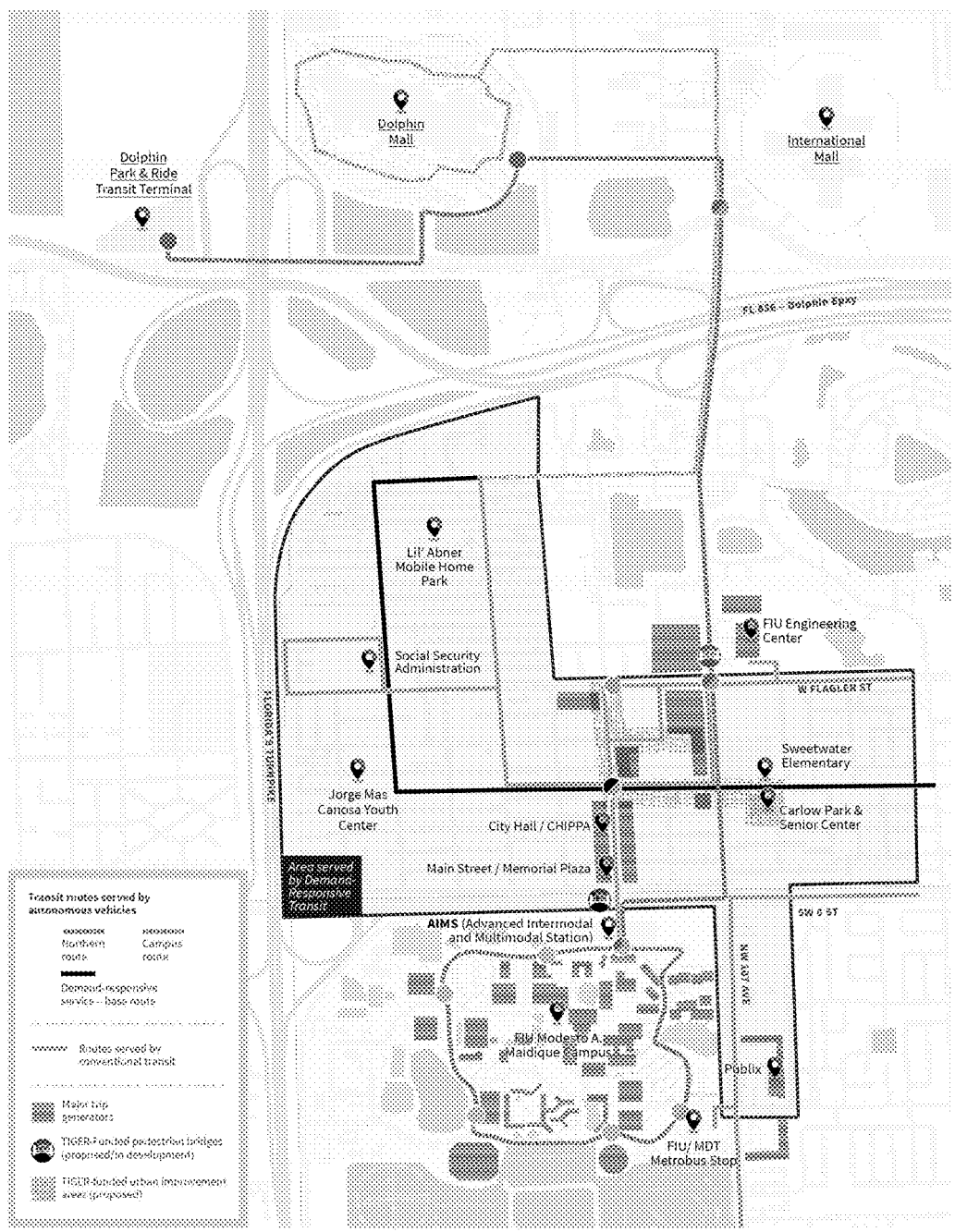
FIG. 5 shows a map of routes that can be taken by vehicles according to an embodiment of the subject invention.

FIG. 5 shows a map of an example route in Florida—the UniversityCity Transit Northern Route that connects an Advanced Intermodal and Multimodal Statioc (AIMS), FIU Modesto Maidique Campus (MMC), FIU Engineering Center (EC), and Sweetwater Main Street extensions to the Dolphin Park and Ride Transit Terminal currently in by Miami-Dade Expressway Authority (MDX), Miami-Dade Transportation and Public Works (MDT), and Florida Department of Transportation (FDOT). This route would provide high-speed access via MDT/MDX express services to the Miami Intermodal Center, Downtown Miami, Homestead, and other destinations to 70,000 students and residents.

The autonomous service can follow a fixed route, but can deviate from it in response to transit requests collected through ITPA. Users can request transit via a smart-phone app, a tablet, or a PC or other electronic device. This can be done, for example, by establishing start and destination locations and a desired travel time. A central algorithm can then negotiate with the user on transit conditions and exact timing, and thus, in the course of an interactive process, compute a mathematically optimal route for the vehicle to follow. However, in retaining a default base line, the service keeps a fallback in case the algorithm does not accomplish an acceptable level of user satisfaction and/or efficiency.

Figure 6:
FIG. 6 shows an image of a steward or vendor on board a street car.
Figure 7:
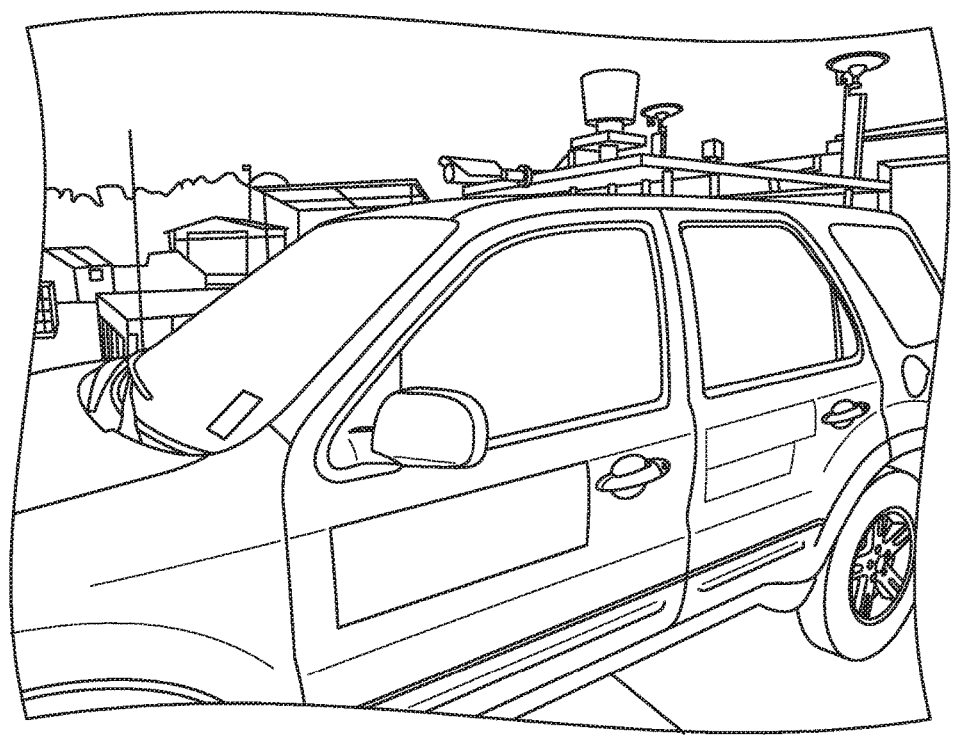
FIG. 7 shows an image of an autonomous vehicle that can be used with embodiments of the subject invention.

The express transit vehicle can traverse its route at a relatively high speed. To handle unforeseen situations, to help disabled passengers to board and alight (adhering to the Americans with Disabilities Act), and to act as a steward and vendor, the autonomous vehicle can have personnel on board. FIG. 6 shows an example of personnel on board a transit vehicle.

Figure 8:
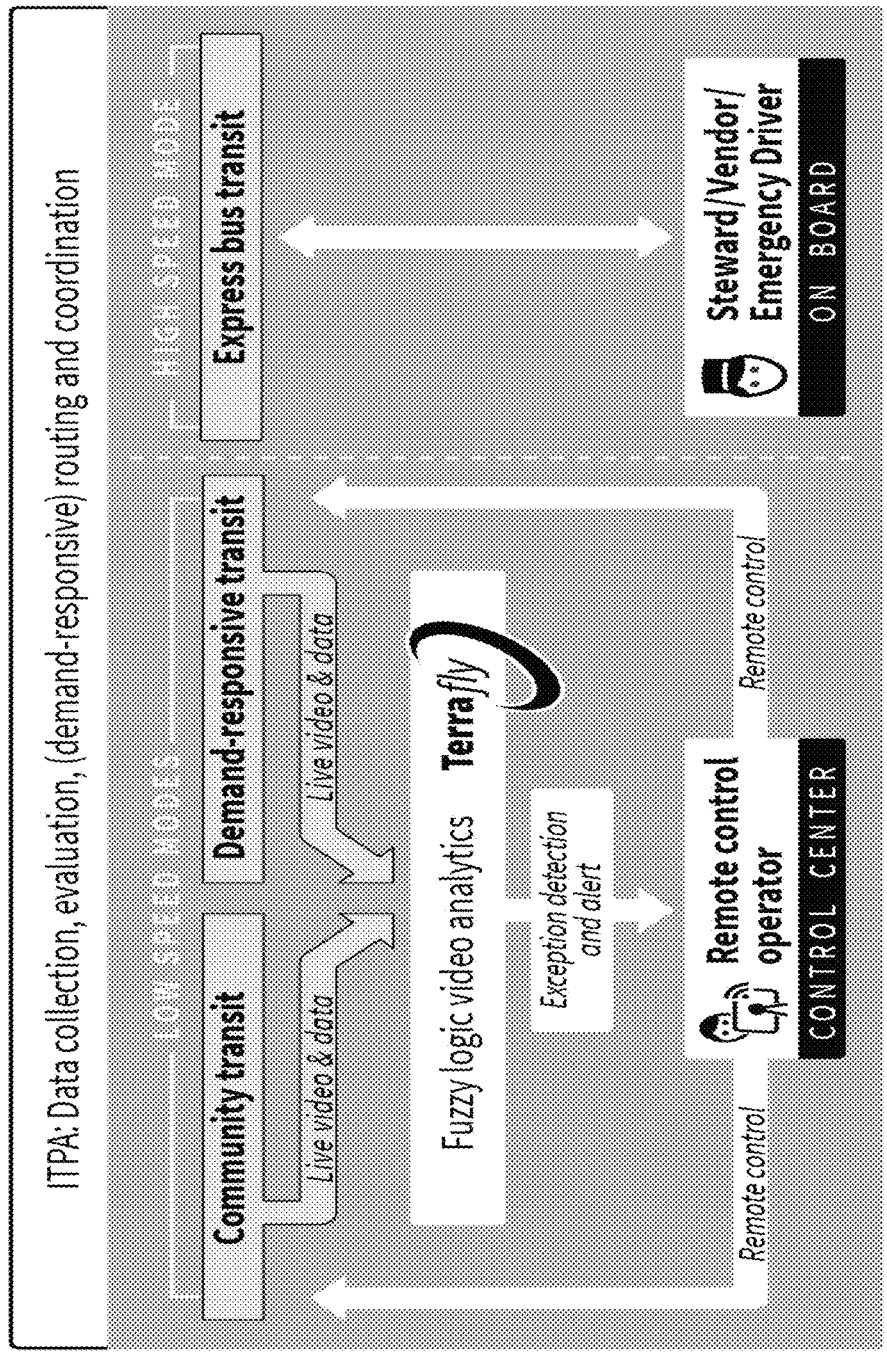
FIG. 8 shows a data flow of a method of an embodiment of the subject invention.
Figure 9A:
FIG. 9 shows images of smart devices (smart phones, tablets) displaying user interfaces according to embodiments of the subject invention.
Figure 9B:
Figure 9C:

Slower-velocity community transit and demand-responsive transit vehicles can continuously stream live video and additional data through a video streaming database and machine learning and fuzzy logic analytics systems, as shown in FIG. 8. The system can detect unforeseen situations (exceptions or events) and alert personnel at the control center that their attention is necessary. If the software detects an event, or if a passenger signals an event via a two-way audio or video channel, an operator can take control of the vehicle via a remote control unit located at the control center, as shown in FIG. 1. In some embodiments, a second remote control unit can be used as backup, for training, simulations, and as part of a demonstration booth for driverless bus technology (e.g., at nationwide events and trade fairs).

Embodiments provide innovative local transportation and transportation management systems and methods, as well as exemplary transportation solutions, yielding scientific and socio-economic benefits. In particular, benefits are provided in the areas of accident reduction, congestion reduction, mode shifting, reduced fossil fuel usage, and reduction of operating and maintenance costs for transit and roadways.

In an embodiment, an Informed Traveler Program and Application (ITPA) can provide an advanced consumer-oriented, predictive, and multimodal transportation management software and technology system. As a large-scale transportation demand management system, ITPA can enable an individual user to make to find an optimum schedule, route, mode, and destination choices, and can enable service providers to manage traffic, transit, and parking more effectively. ITPA can recommend trip segment choices before travel decision points that improve travel arrival times and costs, reduce greenhouse gas emissions, and provide decision support for community transit and parking providers. The system can address individual motorized and un-motorized traffic movements, access to public transit, and parking availabilities. It can be interoperable with, and receive information from, various locally deployed technology systems. ITPA can provide optimum experiences from an individual user's point of view, and also consider global optima regarding resource optimization and maximum decongestion from a public service provider's point of view.

ITPA can reach users by a number of means, including a unified smart-phone app (e.g., for smart phones, tablets, and the like), a website interface for PC based, non-mobile access, and interactive touch-screen kiosks at strategic locations (e.g., parking garages, major bus stops, and urban landmarks). Instead of having to rely on a large number of apps to gain insight into different aspects of city life, ITPA can provide one unified (smart-phone) app, giving one holistic experience to users, and connecting citizens to their service providers. The app can be used on, for example, iOS, Android, and Windows Phone devices, and is consistent, user-friendly, and easy to navigate. For citizens and visitors without immediate access to mobile platforms, a website can provide a subset of the available information and services and can be used to solicit membership applications for the local operators. Some services of the smart-phone app rely on a smart phone's sensory equipment, and so cannot be used with the non-mobile version.

Publically available touch screen terminals can be used with ITPA and can be thought of as 21st century updates to public city maps. Terminals can be positioned at, for example, community transit stops, AIMS, plazas, and major pedestrian-oriented crossings (i.e., where complete streets intersect) and can provide a subset of the available information and services. Some services of the smart-phone app and/or non-mobile web site rely on a personal identification of the user, and so cannot be guaranteed by a public access terminal.

ITPA Situational Awareness Centers are software modules that can provide customizable access and decision support for ITPA operators, giving an overview of system performance. These modules are web-based and require internet-connected PCs, for example including a wall mounted large screen. An ITPA CORE Cloud-Based Server System can be used as well. Running redundantly on multiple servers (or even multiple server farms), it can integrate crowd-sourced and publically available data streams, connect to traffic signal systems, parking providers, and other data providers, run advanced analytics and optimization algorithms, and provide users with relevant information and services.

ITPA Vehicle Interaction Units can be used as well. ITPA is able to connect to off the shelf units used by major transportation service providers all around the nation, and can be used with advanced bi-directional Vehicle Interaction Units, which include optimum predictive passenger information, driver interaction, and transit re-routing capabilities.

ITPA can collect data from autonomous transit vehicles, and in turn provide them with predictive information regarding the state of traffic, routing and demand-responsive routing alternatives, parking availability, and alternative schedules and destinations. While a number of existing applications provide state of traffic information and dynamic rerouting options, ITPA is additionally based on the dispersion of routes, transportation modes, and travel times and suggestions for alternative destinations. Recommendations can therefore include predictive information on optimum means to reach a destination at a desired time.

ITPA can interface with available traffic signal automation systems, aiming for a global optimum to maximize throughput and transit preference. In connection with its traffic information and routing services, it can utilize the information to also improve an individual user's experience. In addition, ITPA can include functionality to automatically collect and evaluate survey data regarding trip origination and destination, user reaction, travel purposes and habits, safety concerns, and other qualitative issues.

ITPA can provide its users with real-time and predictive solution-oriented information on optimum routes and modes, schedule adherence, and available connections. ITPA can also provide an interface and vehicle interaction unit enabling predictive, situationally aware, dynamic rerouting of both autonomous and conventional bus rapid transit and express bus services. While the timetables and the sequence of the serviced stops may stay intact, ITPA can reduce delays by optimizing the movement between stops based on state-of-traffic awareness, dynamically selecting route options based on real-time and predicted information. As an example, this functionality can be utilized to improve FIU's Golden Panther Express services, which traverse Dolphin Expressway, Palmetto Expressway, Golden Gates Intersection, and the Homestead Extension of Florida's Turnpike, and connect both FIU campuses with the Miami Intermodal Center, Palmetto Metrorail Station, and Golden Glade Tri-Rail Station.

Community transit systems provide both local transportation and work as a feeder system to rapid transit systems. ITPA can provide real-time and predictive information on optimum transit routes, schedule adherence, and available connections, based on traveler information and needs, travel times, and vehicle, traveler, and destination locations.

In ITPA's demand-responsive system, participating vehicles can traverse a default route, while users can be enabled to request personalized transit via their smart-phones or non-mobile website access. ITPA can collect these requests, and, after checking for available options, negotiate the conditions (time, cost, start and end points) of a minor dynamic rerouting of a suitable transit vehicle, adhering to technical, policy, and budget restrictions. ITPA can also provide long-term information to service providers on route and service optimization, for example on potential decoupling of routes and schedules.

In addition, instead of relying on expensive in-situ sensors at each individual parking spot, ITPA can apply stochastic models based on scarce data, integrating available data sources and a few standard components like cameras. ITPA's parking information and recommendation services can cover parking lots, parking garages, and on-street parking. In addition to providing an improved experience to individual users, global resource utilization can be considered, aiming at the dispersal of cars, reducing cruising for parking, and thereby reducing overall traffic in heavily loaded areas. ITPA can include interfaces to Pay-by-Phone parking system providers (e.g., all major providers).

ITPA can include information on available short term electric car and moped rentals as well as on bicycle rental infrastructure. It can make related destination-based information available to its users. ITPA can also identify users biking or walking on biking lanes and pedestrian walkways, and can measure these lanes' usage over time. It can be aware of biking and pedestrian lane networks and can include bicycle and pedestrian modes in its routing options. It can collect and distribute available reports on the current state of pedestrian and biking lanes, recommendations, and alerts to users identified as being in the respective modes.

Based on available video information, and using advanced image recognition software, ITPA can measure usage of selected pedestrian infrastructure. ITPA can integrate and provide to ITPA operators a unified view of public state of traffic and incident reports (e.g. by Florida Highway Patrol, Miami-Data Expressway Authority, Miami-Data Transit Authority, City of Miami Department of Public Works, and other agencies). The system can also include ride sharing algorithms, and can also interface with external ride sharing partners or taxi service providers. When a user requests transit recommendations, and appropriate ride sharing options are available, the system can connect to external partners to provide information and to broker transactions. This functionality can integrate with existing ride sharing and carpooling services.

ITPA can embed information on landmarks and commercial institutions, and can be tailored not only to the user's current location, but also based on his or her predicted travel destination, and estimated down-times. For participating businesses, ITPA can provide an electronic coupon service, and the opportunity to review or grade a business after an occurred transaction.

As modes of transportation change over time, the flexible system architecture can be tuned to integrate new realities instead of depending strictly on historical customs and modes of transportation.

The methods and processes described herein can be embodied as code and/or data. The software code and data described herein can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

The subject invention includes, but is not limited to, the following exemplified embodiments.

Embodiment 1

A method for assisting autonomous vehicles comprising:
providing an autonomous vehicle having sensory inputs; and
providing a control center having two-way communication with the autonomous vehicle, including the autonomous vehicle sending sensory input information to the control center and the control center sending control information to the autonomous vehicle (in real time);
wherein the autonomous vehicle communicates events to the control center.

Embodiment 2

The method for assisting autonomous vehicles of Embodiment 1, wherein the sensory inputs include one or more of an exterior front-facing video camera, an exterior rear-facing video camera, a panoramic video camera, an exterior microphone, an interior microphone, a passenger assistance button, and an emergency stop button.

Embodiment 3

The method for assisting autonomous vehicles of any of Embodiments 1-2, wherein the control center controls one or more of the steering, braking, acceleration, locking of doors, and opening and closing of doors and windows of the autonomous vehicle.

Embodiment 4

The method for assisting autonomous vehicles of any of Embodiments 1-3, wherein the control center control speaker(s) of the autonomous vehicle, including one or more of a horn, a general inside speaker, a general outside speaker, a front facing outside speaker, and one or more passenger specific inside speakers.

Embodiment 5

The method for assisting autonomous vehicles of any of Embodiments 1-4, wherein the events include one or more of a passenger pushing the passenger assistance button, a passenger pushing the emergency stop button, and a deadlock situation (i.e., where the autonomous vehicle reaches a threshold uncertainty level, a threshold risk level, and/or a failure of autonomous control).

Embodiment 6

The method for assisting autonomous vehicles of any of Embodiments 1-5, wherein the control center controls and receives information from a plurality or fleet of autonomous vehicles.

Embodiment 7

The method for assisting autonomous vehicles of any of Embodiments 1-6, wherein the autonomous vehicle is a public transit vehicle (i.e., a bus, a van, a trolley, or another multi-passenger vehicle).

Embodiment 8

The method for assisting autonomous vehicles of any of Embodiments 1-7, wherein the control center includes a user interface, including a speaker(s) and/or video display(s).

Embodiment 9

The method for assisting autonomous vehicles of any of Embodiments 1-8, wherein the control center is manned by an operator and the control center allows for the operator to select which sensory inputs are displayed via the user interface.

Embodiment 10

The method for assisting autonomous vehicles of any of Embodiments 1-9, wherein the control center includes a simulator for an operator to control the autonomous vehicle, and wherein the simulator includes one or more of a brake, an accelerator, a visual display (including any or all of the sensory inputs of the autonomous vehicle), a steering wheel, one or more speakers, a headset, and a microphone.

Embodiment 11

The method for assisting autonomous vehicles of any of Embodiments 1-10, wherein the control center (including an operator within) observes some or all of the sensory inputs sua sponte (for any reason, at any time, and not requiring an event).

Embodiment 12

The method for assisting autonomous vehicles of any of Embodiments 1-11, wherein the autonomous vehicle continuously sends sensory input information to a central server (or the control center and autonomous vehicle both send information to a central server, or communicate via a central server).

Embodiment 13

The method for assisting autonomous vehicles of any of Embodiments 1-12, wherein the autonomous vehicle continuously sends sensory input information to a central server and the central server saves the sensory input information for a period of time (e.g. 1 minute, 30 minutes, 1 hour, 4 hours, 12 hours, 1 day, 2 days, 3 days, a week, a month).

Embodiment 14

The method for assisting autonomous vehicles of any of Embodiments 1-13, wherein the autonomous vehicle continuously saves the sensory input information for a period of time (e.g. 1 minute, 30 minutes, 1 hour, 4 hours, 12 hours, 1 day, 2 days, or 3 days).

Embodiment 15

The method for assisting autonomous vehicles of any of Embodiments 1-14, wherein the operator of the control center can replay recorded sensory input information (including audio and video).

Embodiment 16

The method for assisting autonomous vehicles of any of Embodiments 1-15, wherein the server applies machine learning and/or fuzzy logic methods to analyze data from the sensory inputs (including events and deadlock situations).

Embodiment 17

The method for assisting autonomous vehicles of any of Embodiments 1-16, wherein the operator (or a computer automated operator) engages with passengers of the autonomous vehicle.

Embodiment 18

The method for assisting autonomous vehicles of any of Embodiments 1-17, wherein the operator (or a computer automated operator) engages with objects outside the autonomous vehicle (including pedestrians, bicyclists, animals, and other motor vehicles).

Embodiment 19

The method for assisting autonomous vehicles of any of Embodiments 1-18, wherein the server prioritizes the sensory inputs and/or events for the control room (e.g., presenting safety concerns, before deadlock situations, before security concerns, before passenger information requests).

Embodiment 20

The method for assisting autonomous vehicles of any of Embodiments 1-19, wherein the machine learning or fuzzy logic analysis and processing happens within the autonomous vehicle and the control center is only informed of the results of the analysis.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

What is claimed is:
1. A method for assisting autonomous vehicles, the method comprising:

providing an autonomous vehicle having a navigation system comprising sensory inputs; and providing a control center having two-way communication with the autonomous vehicle, including the autonomous vehicle sending sensory input information to the control center and the control center sending control information to the autonomous vehicle;

the autonomous vehicle communicating events to the control center, the events including when the autonomous vehicle determines that a threshold risk level has been met, the determination that the threshold risk level has been met occurring when at least one of the following occurs: a pedestrian exhibiting unpredictable behavior in a roadway ahead of the autonomous vehicle; a pedestrian or bicyclist being in proximity to the autonomous vehicle or approaching the autonomous vehicle at a speed that exceeds a threshold approach speed; and the navigation system of the autonomous vehicle not functioning properly, the control center comprising a simulator capable of controlling the autonomous vehicle in response to the autonomous vehicle determining that the threshold risk level has been met, the simulator comprising a brake, an accelerator, a visual display, and a steering wheel.

2. The method for assisting autonomous vehicles according to claim 1, wherein the events include a passenger pressing a passenger assistance button or a passenger pressing an emergency stop button.

3. The method for assisting autonomous vehicles according to claim 1, wherein the sensory inputs include one or more exterior front-facing video cameras and one or more exterior rear-facing video cameras.

4. The method for assisting autonomous vehicles according to claim 3, wherein the control center controls steering, braking, and acceleration of the autonomous vehicle.

5. The method for assisting autonomous vehicles according to claim 4, wherein the control center controls the locking of doors, and opening and closing of doors and windows of the autonomous vehicle.

6. The method for assisting autonomous vehicles according to claim 4, wherein the control center controls a horn, one or more inside speakers, and one or more outside speakers of the autonomous vehicle.

7. The method for assisting autonomous vehicles according to claim 1, wherein the control center controls and receives information from a plurality or fleet of autonomous vehicles.

8. The method for assisting autonomous vehicles according to claim 6, wherein the control center includes a user interface, including one or more speakers, one or more microphones, and one or more visual displays.

9. The method for assisting autonomous vehicles according to claim 8, wherein the control center is manned by an operator and the operator selects which sensory inputs are displayed via the user interface.

10. The method for assisting autonomous vehicles according to claim 1, wherein the central server applies machine learning or fuzzy logic methods to analyze data from the sensory inputs to determine or respond to events.

11. A method for assisting autonomous vehicles, the method comprising:

providing an autonomous vehicle having a navigation system comprising sensory inputs; and providing a control center having two-way communication with the autonomous vehicle, including the autonomous vehicle sending sensory input information to the control center and the control center sending control information to the autonomous vehicle;

the autonomous vehicle communicating events to the control center, the sensory input information being saved, the events including when the autonomous vehicle determines that a threshold risk level has been met, the determination that the threshold risk level has been met occurring when at least one of the following occurs: a pedestrian exhibiting unpredictable behavior in a roadway ahead of the autonomous vehicle; a pedestrian or bicyclist being in proximity to the autonomous vehicle or approaching the autonomous vehicle at a speed that exceeds a threshold approach speed; and the navigation system of the autonomous vehicle not functioning properly, the control center comprising a simulator capable of controlling the autonomous vehicle in response to the autonomous vehicle determining that the threshold risk level has been met, the simulator comprising a brake, an accelerator, a visual display, and a steering wheel.

12. The method for assisting autonomous vehicles according to claim 11, the control center being capable of taking control of the autonomous vehicle without requiring the events.

13. The method for assisting autonomous vehicles according to claim 11, further comprising providing a central server that saves the sensory input information from the autonomous vehicle and the control information from the control center.

14. The method for assisting autonomous vehicles according to claim 11, wherein an operator of the control center replays the saved sensory input information.

15. The method for assisting autonomous vehicles according to claim 13, wherein the central server applies machine learning or fuzzy logic methods to analyze data from the sensory inputs to determine or respond to events.

16. A method for assisting autonomous vehicles, the method comprising:

providing an autonomous vehicle having a navigation system comprising sensory inputs, including one or more exterior front-facing video cameras and one or more exterior rear-Facing video cameras;

providing a control center having two-way communication with the autonomous vehicle, including the autonomous vehicle sending sensory input information to the control center and the control center sending control information to the autonomous vehicle;

controlling steering, braking, and acceleration of the autonomous vehicle from the control center;

providing a central server applies machine learning or fuzzy logic methods to analyze data from the sensory inputs to determine or respond to events; and providing an immersive simulator within the control center;

the autonomous vehicle communicating the events to the control center, the events including when the autonomous vehicle determines that a threshold risk level has been met, the determination that the threshold risk level has been met occurring when at least one of the following occurs: a pedestrian exhibiting unpredictable behavior in a roadway ahead of the autonomous vehicle; a pedestrian or bicyclist being in proximity to the autonomous vehicle or approaching the autonomous vehicle at a speed that exceeds a threshold approach speed; and the navigation system of the autonomous vehicle not functioning properly, the control center comprising a simulator capable of controlling the autonomous vehicle in response to the autonomous vehicle determining that the threshold risk level has been met, the simulator comprising a brake, an accelerator, a visual display, and a steering wheel.

17. The method for assisting autonomous vehicles according to claim 1, the determination that the threshold risk level has been met occurring when the navigation system of the autonomous vehicle is not functioning properly.

18. The method for assisting autonomous vehicles according to claim 11, the determination that the threshold risk level has been met occurring when the navigation system of the autonomous vehicle is not functioning properly.

19. The method for assisting autonomous vehicles according to claim 16, the determination that the threshold risk level has been met occurring when the navigation system of the autonomous vehicle is not functioning properly.

* * * * *